Patented Aug. 2, 1938

2,125,284

UNITED STATES PATENT OFFICE 2,125,284

PROCESS FOR THE PREPARATION OF ETHYL CHLORIDE

Leonard C. Chamberlain and Jack L. Williams, Midland, Mich., assignors to The Dow Chemical Company, Midland, Mich., a corporation of Michigan No Drawing. Application November 11, 1935, Serial No. 49,250

7 Claims. (Cl. 260—162)

The present invention relates to methods for the preparation of ethyl chloride by combining ethylene and hydrogen chloride.

We have now discovered that ethylene and hydrogen chloride can be combined to produce ethyl chloride in high yield by passing the gases through a liquid reaction medium comprising ethyl sulphuric acid containing metallic bismuth or a bismuth compound, at approximately atmospheric pressure and at moderate temperatures.

The temperature at which the liquid medium should be maintained is preferably above the boiling point of the ethyl chloride, and is usually between about 12° C. and about 120° C., although somewhat higher temperatures can be used. We find that when we conduct our reaction at temperatures ranging between about 80° C. and about 110° C., high yields of ethyl chloride are obtained and the ethyl chloride distills from the reaction medium as rapidly as it is formed. The reaction takes place under these conditions at substantially atmospheric pressure, although higher or lower pressures may be used, if desired. The yield of ethyl chloride, per pound of catalyst used, is much greater than is possible with the use of other catalysts heretofore employed.

We can employ either pure ethylene or mixtures of ethylene with inert gases in carrying out our invention. For example, we have used an olefiant gas, obtained by the pyrolytic decomposition of petroleum or its fractions, for example, according to the method described in United States Patent 1,962,502, containing up to 50 per cent by volume of ethylene, the balance being substantially inert gases such as ethane, methane, hydrogen, and carbon monoxide.

Among the bismuth compounds which we have successfully employed as catalytic agents in carrying out the reaction are the chloride, bromide, sub-nitrate, sub-carbonate, and sulphate, as well as metallic bismuth. We have found that other catalysts such as aluminum chloride and ferric chloride, as well as many others which do not contain bismuth, are ineffective to promote the reaction in ethyl sulphuric acid.

The following example illustrates the practice of our invention, but is not to be construed as a limitation thereof:

Dry ethylene gas was passed at the rate of 0.45 cubic foot per hour into 340 grams of ethyl sulphuric acid having suspended therein 20 grams of bismuth chloride, and anhydrous hydrogen chloride gas was concurrently passed in at the rate of 0.45 cubic foot per hour. The ethyl sulphuric acid which we used was prepared by mixing concentrated sulphuric acid with sufficient 30 per cent fuming sulphuric acid to produce 100 per cent sulphuric acid, and subsequently mixing this acid with diethyl sulphate in equimolecular proportions to obtain the desired ethyl sulphuric acid. The bath was maintained at a temperature of approximately 100° C., and the pressure thereon was about atmospheric. The ethyl chloride produced distilled from the bath as rapidly as it was formed, and at the end of 22 hours 778 grams of product had been collected in a carbon dioxide-cooled receiver. By distillation of this product 763 grams of pure ethyl chloride was obtained, representing a yield of 93 per cent of theoretical, based on the amount of ethylene used. At the end of this period of time there was no apparent decrease in the catalytic activity of the bath.

In comparable runs, covering periods of from four to seven days, we have obtained ratios by weight of ethyl chloride produced to catalyst employed of up to 227 to 1, and have found that, at the conclusion of such runs, the catalyst remained active.

Advantageously, ethylene and hydrogen chloride are employed in approximately equimolecular proportions in carrying out our process, although the invention is not limited thereto, other proportions of the two gases also being operative. We can prepare the ethyl sulphuric acid which is used in our process by passing ethylene through concentrated sulphuric acid for a suitable period of time. We preferably maintain the reaction bath in a substantially anhydrous condition and use dry ethylene and hydrogen chloride, although this is not perforce necessary.

Other modes of applying the principle of our invention may be employed instead of the one explained, change being made as regards the process herein disclosed, provided the step stated by any of the following claims of the equivalent of such stated step be employed.

We therefore particularly point out and distinctly claim as our invention:

1. In a process for the production of ethyl chloride, the step which consists in passing ethylene and hydrogen chloride into a substantially anhydrous liquid bath of ethyl sulphuric acid containing a bismuth compound.

2. In a process for the production of ethyl chloride, the step which consists in passing ethylene and hydrogen chloride into a substantially anhydrous liquid bath of ethyl sulphuric acid containing bismuth chloride.

3. In a process for the production of ethyl chloride, the step which consists in passing ethylene and hydrogen chloride into a substantially anhydrous liquid bath of ethyl sulphuric acid containing metallic bismuth.

4. In a process for the production of ethyl chloride, the step which consists in passing ethylene and hydrogen chloride into a substantially anhydrous liquid bath of ethyl sulphuric acid containing bismuth chloride and maintained at a temperature between about 80° and about 110° C.

5. In a process for the production of ethyl chloride, the step which consists in passing ethylene and hydrogen chloride into a substantially anhydrous liquid bath of ethyl sulphuric acid containing bismuth chloride and maintained at a temperature between about 50° and about 100° C. at approximately atmospheric pressure.

6. In a process for the production of ethyl chloride, the step which consists in passing dry ethylene and dry hydrogen chloride into a substantially anhydrous liquid bath of ethyl sulphuric acid containing bismuth chloride and maintained at a temperature between about 50° and about 100° C. at approximately atmospheric pressure, and collecting the ethyl chloride distilling therefrom.

7. In a process for the production of ethyl chloride, the step which consists in passing ethylene and hydrogen chloride into a substantially anhydrous liquid bath of ethyl sulphuric acid containing a material selected from the group consisting of bismuth compounds and metallic bismuth.

LEONARD C. CHAMBERLAIN.
JACK L. WILLIAMS.